United States Patent
Normile et al.

(10) Patent No.: US 7,272,224 B1
(45) Date of Patent: Sep. 18, 2007

(54) ECHO CANCELLATION

(75) Inventors: James Oliver Normile, Los Altos, CA (US); Ryan R. Salsbury, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 776 days.

(21) Appl. No.: 10/379,125

(22) Filed: Mar. 3, 2003

(51) Int. Cl.
*H04M 1/00* (2006.01)

(52) U.S. Cl. .................. 379/390.03; 379/387.01; 379/395; 379/406.01; 379/406.08; 379/406.14

(58) Field of Classification Search .......... 379/406.01, 379/406.08, 406.14, 387.01, 390.03, 395
See application file for complete search history.

(56) References Cited

U.S. PATENT DOCUMENTS

| | | | |
|---|---|---|---|
| 5,568,558 A | 10/1996 | Ramm et al. | |
| 5,619,508 A | 4/1997 | Davis et al. | |
| 5,646,990 A * | 7/1997 | Li | 379/406.08 |
| 5,796,819 A | 8/1998 | Romesburg | |
| 5,828,756 A | 10/1998 | Benesty et al. | |
| 5,937,060 A | 8/1999 | Oh | |
| 6,091,813 A | 7/2000 | Harley et al. | |
| 6,201,866 B1 | 3/2001 | Ariyama et al. | |
| 6,249,581 B1 | 6/2001 | Kok | |
| 6,381,272 B1 | 4/2002 | Ali | |
| 6,434,247 B1 | 8/2002 | Kates | |
| 6,442,275 B1 * | 8/2002 | Diethorn | 379/406.14 |
| 6,574,336 B1 * | 6/2003 | Kirla | 379/406.01 |
| 6,744,884 B1 * | 6/2004 | Bjarnason | 379/406.01 |

* cited by examiner

*Primary Examiner*—Jefferey Harold
(74) *Attorney, Agent, or Firm*—Schwegman, Lundberg, Woessner & Kluth, P.A.

(57) ABSTRACT

A method, apparatus, system, and signal-bearing medium that in an embodiment determine a degree of correlation between a speaker output signal and a microphone input signal and modulate an adaptive gain of an acoustic echo canceller based on the degree of correlation.

36 Claims, 4 Drawing Sheets

ECHO CANCELLATION

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to cancellation of echo in audio signals.

BACKGROUND

In the past, people met face-to-face when they wanted to communicate. But, in today's mobile, widely dispersed, and increasingly interconnected society, people often need to communicate with others who are far away. In order to facilitate this communication, teleconferencing and video conferencing are gaining in popularity. In teleconferencing, both parties have a conferencing system that may include a microphone and a speaker, and the parties are connected to each other via a network, so that they can converse. In video conferencing, the parties also have a camera and a video monitor, so the parties can converse while viewing still or moving video images of each other.

Teleconferencing and video conferencing systems suffer from the problem of acoustic echo, which is a delayed and distorted version of an original sound reflected back to its source. A traditional system typically includes a speaker/microphone pair on both ends (called the near-end and the far-end) of the connection. When near-end participants talk, their voices are picked up by the near-end microphone, transmitted to the far-end, and presented via the far-end speaker. The far-end microphone will also pick up this signal, directly or indirectly, and the far-end system will send it back to the near-end. This causes the near-end participants to hear a delayed and distorted version of their own speech, which is annoying.

Previous systems attempted to suppress echo by suppressing the signal from the microphone at one end when audio from the other end is present. Unfortunately, this leads to clipping of the voice signal and reduced intelligibility. More sophisticated systems employ active noise cancellation using a filter adapted to model the characteristics of the feedback paths between the speaker and the microphone. This suffers from the problems of high computational load of the filtering operation, difficulty in selecting an appropriate gain for the filter, and divergence of the filter when participants at the near and far ends are speaking simultaneously.

Although the problem of echo has been described in the context of teleconferencing and video conferencing, it can also occur when placing a telephone call with a speakerphone or whenever a speaker produces sound that enters a microphone.

SUMMARY

A method, apparatus, system, and signal-bearing medium are provided that in an embodiment determine a degree of correlation between a speaker output signal and a microphone input signal and modulate an adaptive gain of an acoustic echo canceller based on the degree of correlation.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The following detailed description is, therefore, not to be taken in a limiting sense, and the scope of the present invention is defined only by the appended claims.

In the following description, numerous specific details are set forth to provide a thorough understanding of the invention. It is understood, however, that the invention may be practiced without these specific details. In other instances, well-known circuits, structures, and techniques have not been shown in detail in order not to obscure the invention.

Figure 1:
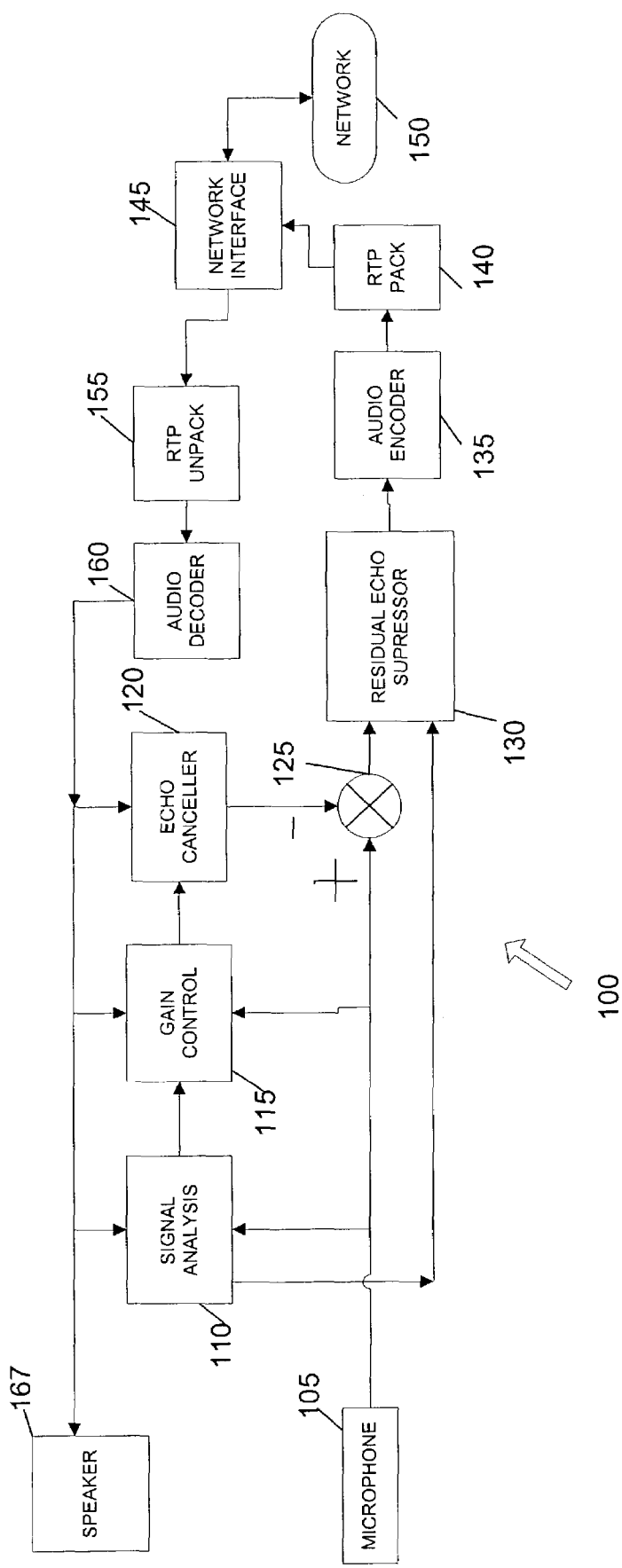
FIG. 1 depicts a block diagram of an example system for implementing an embodiment of the invention.

FIG. 1 depicts a block diagram of an example system 100 for implementing an embodiment of the invention. The system 100 includes a microphone 105, a signal analysis 110, a gain control 115, an echo canceller 120, a subtractor 125, a residual echo suppressor 130, an audio encoder 135, an RTP (Real-time Transport Protocol) pack 140, a network interface 145, a network 150, an RTP unpack 155, an audio decoder 160, and a speaker 167. In various embodiments, the elements in the system 100 may be implemented via hardware, software, or a combination of hardware and software.

The microphone 105 collects sound and presents audio input signals to the signal analysis 110, the gain control 115, and the subtractor 125. Although only one microphone 105 is shown, in other embodiments multiple microphones may be present.

The signal analysis 110 receives input signals from the microphone 105 and the audio decoder 160 and produces output signals to the gain control 115. The functions of the signal analysis 110 are further described below with reference to FIG. 2.

The gain control 115 receives input signals from the microphone 105, the signal analysis 110, and the audio decoder 160 and produces output signals to the echo canceller 120. The functions of the gain control 115 are further described below with reference to FIG. 2.

The echo canceller 120 receives input signals from the audio decoder 160 and the gain control 115 and produces output signals to the subtractor 125. The functions of the echo canceller 120 are further described below with reference to FIG. 2.

The subtractor 125 subtracts the output of the echo canceller 120 from the signal from the microphone 105 and outputs the result to the residual echo suppressor 130, as further described below with reference to FIG. 3.

The residual echo suppressor 130 receives input signals from the subtractor 125 and the signal analysis 110 and produces output signals to the audio encoder 135. The functions of the residual echo suppressor 130 are further described below with reference to FIG. 3.

The audio encoder 135 receives input signals from the residual echo suppressor 130 and produces output signals to the RTP pack 140.

The RTP pack 140 packs the data in the RTP format and presents it to the network interface 145. RTP is a standard for the transmission of audio and video data. Although the use of RTP is shown in FIG. 1, in other embodiments any appropriate standard or protocol for transmitting and receiving data may be used.

The network interface 145 sends data from the RTP pack 140 to the network 150 and receives data from the network 150 and sends it to the RTP unpack 155.

The RTP unpack 155 receives data from the network interface 145, unpacks the data, and sends it to the audio decoder 160.

The audio decoder 160 receives data from the RTP unpack 155 and sends audio signals to the signal analysis 110, the gain control 115, the echo canceller 120, and the speaker 167.

The network 150 may be any suitable network and may support any appropriate protocol suitable for communication. In an embodiment, the network 150 may support wireless communications. In another embodiment, the network 150 may support hard-wired communications, such as a telephone line or cable. In another embodiment, the network 150 may support the Ethernet IEEE (Institute of Electrical and Electronics Engineers) 802.3x specification. In another embodiment, the network 150 may be the Internet and may support TP (Internet Protocol). In another embodiment, the network 150 may be a local area network (LAN) or a wide area network (WAN). In another embodiment, the network 150 may be a hotspot service provider network. In another embodiment, the network 150 may be an intranet. In another embodiment, the network 150 may be a GPRS (General Packet Radio Service) network. In another embodiment, the network 150 may be any appropriate cellular data network or cell-based radio network technology. In another embodiment, the network 150 may be an IEEE 802.11B wireless network. In still another embodiment, the network 150 may be any suitable network or combination of networks. Although one network 150 is shown, in other embodiments any number of networks (of the same or different types) may be present.

The speaker 167 receives output signals from the audio decoder 160 and in response produces corresponding sound. The speaker 167 is situated so that its sound or a portion of its sound may be received, directly or indirectly, by the microphone 105. Although only one speaker 167 is shown, in other embodiments any number and type of speakers may be present.

Figure 2:
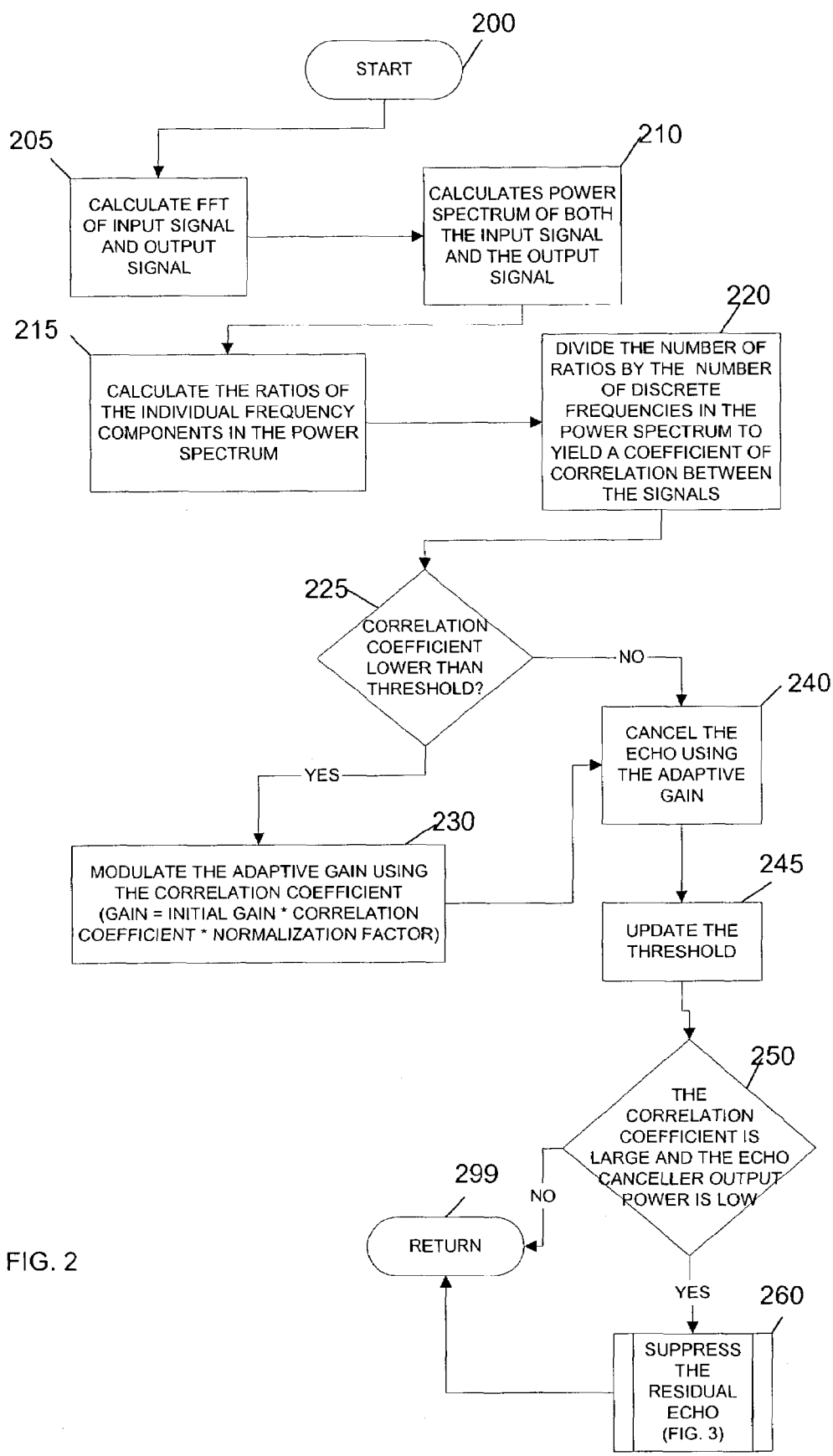
FIG. 2 depicts a flowchart of example processing, according to an embodiment of the invention.

FIG. 2 depicts a flowchart of example processing, according to an embodiment of the invention. Control begins at block 200. Control then continues to block 205 where the signal analysis 110 receives an input signal from the microphone 105 and calculates a FFT (Fast Fourier Transform) of the input signal and outputs the signal to the residual echo suppressor 130. Control then continues to block 210 where the signal analysis 110 calculates a power spectrum of both the input signal and the output signal. Control then continues to block 215 where the signal analysis 110 calculates the ratios of the individual frequency components of the power spectrum.

Control then continues to block 220 where the signal analysis 110 divides the number of ratios that exceed a threshold by the number of discrete frequencies in the power spectrum to yield a coefficient of correlation between the signals. Control then continues to block 225 where the signal analysis 110 determines whether the correlation coefficient is lower than a threshold. If the determination at block 225 is true, then control continues to block 230 where the gain control 115 modulates the adaptive gain using the correlation coefficient. In an embodiment, the gain is set to the initial gain multiplied by the correlation coefficient multiplied by a normalization factor.

Control then continues to block 240 where the echo canceller 120 cancels the echo using the adaptive gain. Control then continues to block 245 where the signal analysis 110 updates the threshold. Control then continues to block 250 where the residual echo suppressor 130 determines whether the correlation coefficient is large and the output power of the echo canceller 120 is low. If the determination at block 250 is true, then control continues to block 260 where the residual echo suppressor 130 suppresses the echo as further described below with reference to FIG. 3. Control then continues to block 299 where the function returns.

If the determination at block 250 is false, then control continues directly to block 299 where the function returns.

If the determination at block 225 is false, then control continues directly to block 240, as previously described above.

Figure 3:
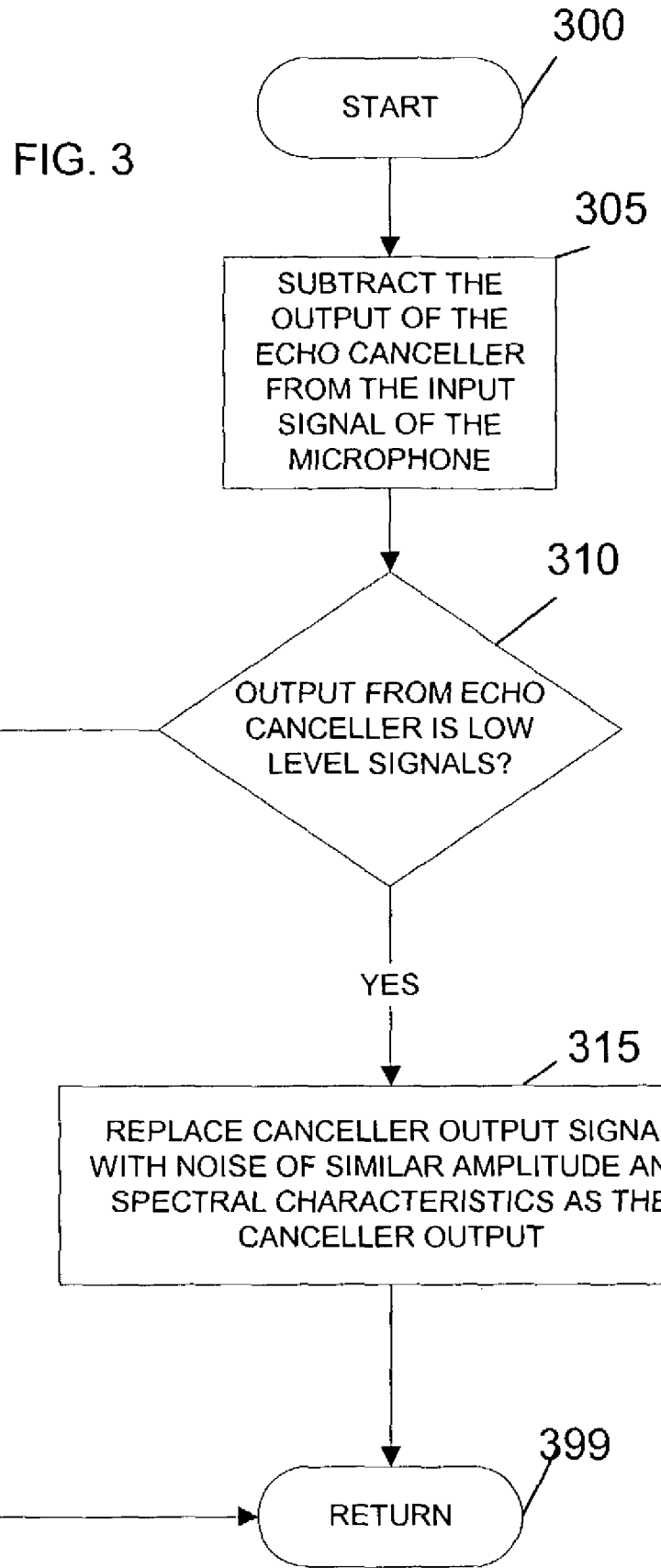
FIG. 3 depicts a flowchart of example processing, according to an embodiment of the invention.

FIG. 3 depicts a flowchart of example processing, according to an embodiment of the invention. Control begins at block 300. Control then continues to block 305 where the subtractor 125 subtracts the output of the echo canceller 120 from the input signal of the microphone 105 and sends the result to the residual echo suppressor 130. Control then continues to block 310 where the residual echo suppressor 130 determines whether an output from the echo canceller 120 is low level signals. If the determination at block 310 is true, then control continues to block 315 where the residual echo suppressor 130 replaces the output of the echo canceller 120 with an output signal with noise of similar amplitude and spectral characteristics as the output of the echo canceller 120. Control then continues to block 399 where the function returns.

If the determination at block 310 is false, then control continues directly to block 399 where the function returns.

Figure 4:
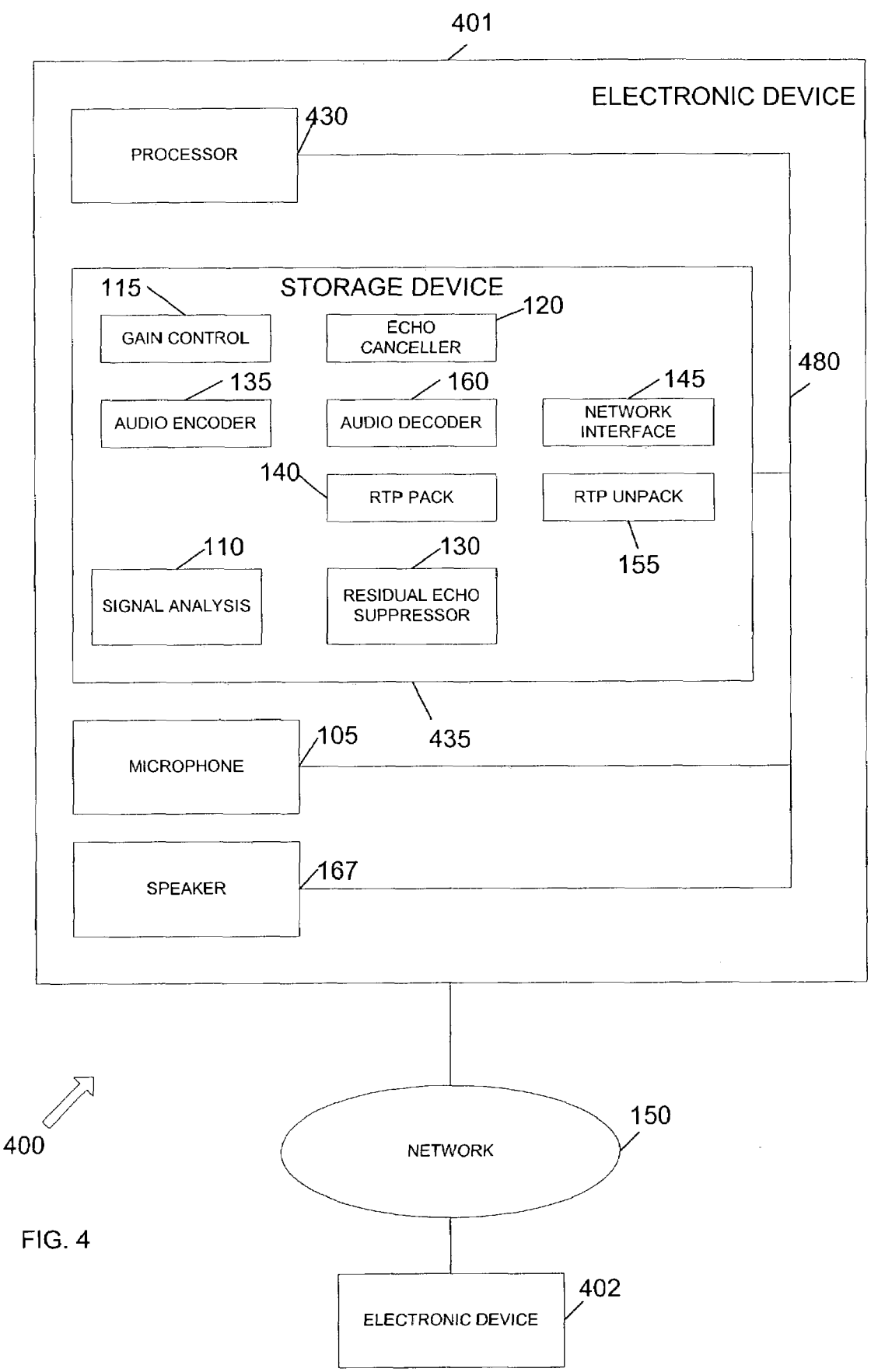
FIG. 4 depicts a block diagram of an example system for implementing an embodiment of the invention.

FIG. 4 depicts a block diagram of an example system 400 for implementing an embodiment of the invention. The system 400 includes an electronic device 401 connected to an electronic device 402 via a network 150. Although one electronic device 401, one electronic device 402, and one network 150 are shown, in other embodiments any number or combination of them are present.

The electronic device 401 includes a processor 430, a storage device 435, the microphone 105, and the speaker 167, all connected directly or indirectly via a bus 480.

The processor 430 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 430 executes instructions and includes that portion of the electronic device 401 that controls the operation of the entire electronic device. Although not depicted in FIG. 4, the processor 430 typically includes a control unit that organizes data and program storage in memory and transfers data and other information between the various parts of the electronic device 401. The processor 430 receives input data from the network 150 and the microphone 105, reads and stores code and data in the storage device 435, and presents data to the network 150 and/or the speaker 167.

Although the electronic device 401 is shown to contain only a single processor 430 and a single bus 480, the present invention applies equally to electronic devices that may have multiple processors and to electronic devices that may have multiple buses with some or all performing different functions in different ways.

The storage device 435 represents one or more mechanisms for storing data. For example, the storage device 435 may include read only memory (ROM), random access memory (RAM), magnetic disk storage media, optical storage media, flash memory devices, and/or other machine-readable media. In other embodiments, any appropriate type of storage device may be used. Although only one storage device 435 is shown, multiple storage devices and multiple types of storage devices may be present. Further, although the electronic device 401 is drawn to contain the storage device 435, it may be distributed across other electronic devices.

The storage device 435 includes the signal analysis 110, the gain control 115, the echo canceller 120, the residual echo suppressor 130, the audio encoder 135, the RTP pack 140, the network interface 145, the RTP unpack 155, and the audio decoder 160, all of which include instructions capable of being executed on the processor 430 to carry out the functions of the present invention, as previously described above with reference to FIGS. 1, 2, and 3. In another embodiment, some or all of the functions of the present invention are carried out via hardware. Of course, the storage device 435 may also contain additional software and data (not shown), which is not necessary to understanding the invention.

Although the signal analysis 110, the gain control 115, the echo canceller 120, the residual echo suppressor 130, the audio encoder 135, the RTP pack 140, the network interface 145, the RTP unpack 155, and the audio decoder 160 are shown to be within the storage device 435 in the electronic device 401, in another embodiment they may be distributed across other systems.

The bus 480 may represent one or more busses, e.g., PCI, ISA (Industry Standard Architecture), X-Bus, EISA (Extended Industry Standard Architecture), or any other appropriate bus and/or bridge (also called a bus controller).

The electronic device 401 may be implemented using any suitable hardware and/or software, such as a personal computer or other electronic computing device. Portable computers, laptop or notebook computers, PDAs (Personal Digital Assistants), pocket computers, appliances, telephones, teleconferencing systems, video conferencing systems, and mainframe computers are examples of other possible configurations of the electronic device 401. The hardware and software depicted in FIG. 4 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Further, the electronic device 401 may include any number and type of input devices for receiving input from a user, e.g., a keyboard, mouse or other pointing device, or a voice-recognition device.

The electronic device 402 may include components analogous to some or all of the components already described for the electronic device 401.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

What is claimed is:

1. A method comprising:
   determining a degree of correlation between a speaker output signal and a microphone input signal; and
   modulating an adaptive gain of an acoustic echo canceller based on the degree of correlation,
   wherein determining the degree of correlation comprises,
   calculating a power spectrum of the microphone input signal and the speaker output signal,
   calculating ratios of frequency components in the power spectrum
   dividing a number of the ratios that exceed a threshold by a number of discrete frequencies in the power spectrum.

2. The method of claim 1, further comprising:
   suspending the modulating when the degree of correlation is less than a threshold.

3. The method of claim 1, wherein modulating the adaptive gain further comprises:
   modulating the adaptive gain to be proportional to the degree of correlation.

4. The method of claim 1, wherein the acoustic echo canceller reduces an echo based on modulating the adaptive gain.

5. The method of claim 4, further comprising:
   suppressing a residual echo that was not reduced by the acoustic echo canceller.

6. The method of claim 5, wherein suppressing further comprises:
   adding noise at a same amplitude and with similar spectral characteristics as the residual echo.

7. The method of claim 1, wherein determining the degree of correlation further comprises:
   calculating a frequency transform of the microphone input signal and the speaker output signal.

8. The method of claim 1, further comprising:
   resetting the acoustic echo canceller if the adaptive gain is greater than a threshold.

9. The method of claim 1, further comprising:
   reducing the adaptive gain if the adaptive gain is greater than a threshold.

10. An apparatus comprising:
    means for determining a degree of correlation between a speaker output signal and a microphone input signal; and
    means for modulating an adaptive gain of an acoustic echo canceller based on the degree of correlation,
    wherein determining means comprises,
    means for calculating a power spectrum of a microphone input signal and a speaker output signal;
    means for calculating ratios of frequency components in the power spectrum;

means for dividing a number of the ratios that exceed a threshold by a number of discrete frequencies in the power spectrum.

11. The apparatus of claim 10, further comprising:
means for suspending the modulating when the degree of correlation is less than a threshold.

12. The apparatus of claim 10, wherein the means for modulating the adaptive gain further comprises:
means for modulating the adaptive gain to be proportional to the degree of correlation.

13. The apparatus of claim 10, wherein the acoustic echo canceller further comprises:
means for reducing an echo based on the means for modulating the adaptive gain.

14. The apparatus of claim 13, further comprising:
means for suppressing a residual echo that was not reduced by the means for reducing the echo.

15. The apparatus of claim 13, wherein the means for suppressing further comprises:
means for adding noise at a same amplitude and with similar spectral characteristics as the residual echo.

16. The apparatus of claim 10, wherein the means for determining the degree of correlation further comprises:
means for calculating a frequency transform of the microphone input signal and the speaker output signal.

17. The apparatus of claim 10, further comprising:
means for resetting the acoustic echo canceller if the adaptive gain is greater than a threshold.

18. The apparatus of claim 10, further comprising:
means for reducing the adaptive gain if the adaptive gain is greater than a threshold.

19. A signal-bearing medium bearing instructions, wherein the instructions when read and executed perform operations that comprise:
determining a degree of correlation between a speaker output signal and a microphone input signal; and
modulating an adaptive gain of an acoustic echo canceller based on the degree of correlation,
wherein the determining comprises,
calculating a power spectrum of a microphone input signal and a speaker output signal,
calculating ratios of frequency components in the power spectrum,
dividing a number of the ratios that exceed a threshold by a number of discrete frequencies in the power spectrum to generate a correlation coefficient.

20. The signal-bearing medium of claim 19, further comprising:
suspending the modulating when the degree of correlation is less than a threshold.

21. The signal-bearing medium of claim 19, wherein modulating the adaptive gain further comprises:
modulating the adaptive gain to be proportional to the degree of correlation.

22. The signal-bearing medium of claim 19, wherein the acoustic echo canceller reduces an echo based on the modulating the adaptive gain.

23. The signal-bearing medium of claim 22, further comprising:
suppressing a residual echo that was not reduced by the acoustic echo canceller.

24. The signal-bearing medium of claim 23, wherein suppressing further comprises:
adding noise at a same amplitude and with similar spectral characteristics as the residual echo.

25. The signal-bearing medium of claim 19, wherein determining the degree of correlation further comprises:
calculating a frequency transform of the microphone input signal and the speaker output signal.

26. The signal-bearing medium of claim 19, further comprising:
resetting the acoustic echo canceller if the adaptive gain is greater than a threshold.

27. The signal-bearing medium of claim 19, further comprising:
reducing the adaptive gain if the adaptive gain is greater than a threshold.

28. An electronic device comprising:
a processor; and
a storage device bearing instructions, which when executed on the processor cause the electronic device to perform operations that comprise:
determining a degree of correlation between a speaker output signal and a microphone input signal; and
modulating an adaptive gain of an acoustic echo canceller based on the degree of correlation,
wherein the determining comprises,
calculating a power spectrum of a microphone input signal and a speaker output signal,
calculating ratios of frequency components in the power spectrum,
dividing a number of the ratios that exceed a threshold by a number of discrete frequencies in the power spectrum to generate a correlation coefficient.

29. The electronic device of claim 28, wherein the instructions further comprise:
suspending the modulating when the degree of correlation is less than a threshold.

30. The electronic device of claim 28, wherein modulating the adaptive gain further comprises:
modulating the adaptive gain to be proportional to the degree of correlation.

31. The electronic device of claim 28, wherein the acoustic echo canceller reduces an echo based on the modulating the adaptive gain.

32. The electronic device of claim 31, wherein the instructions further comprise:
suppressing a residual echo that was not reduced by the acoustic echo canceller.

33. The electronic device of claim 32, wherein suppressing further comprises:
adding noise at a same amplitude and with similar spectral characteristics as the residual echo.

34. The electronic device of claim 28, wherein determining the degree of correlation further comprises:
calculating a frequency transform of the microphone input signal and the speaker output signal.

35. The electronic device of claim 28, wherein the instructions further comprise:
resetting the acoustic echo canceller if the adaptive gain is greater than a threshold.

36. The electronic device of claim 28, wherein the instructions further comprise:
reducing the adaptive gain if the adaptive gain is greater than a threshold.

* * * * *